United States Patent
Drouart et al.

(10) Patent No.: US 7,736,417 B2
(45) Date of Patent: Jun. 15, 2010

(54) METHOD OF ADJUSTING AN INSTALLATION FOR THE ADSORPTION TREATMENT OF A GAS

(75) Inventors: Caroline Drouart, Chatillon (FR); Jean-Christophe Aubel, Paris (FR); Yves Engler, Chatou (FR); Laurent Allidieres, Saint Martin D'Uriage (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 225 days.

(21) Appl. No.: 11/909,698

(22) PCT Filed: Feb. 23, 2006

(86) PCT No.: PCT/FR2006/050159

§ 371 (c)(1),
(2), (4) Date: Apr. 25, 2008

(87) PCT Pub. No.: WO2006/100398

PCT Pub. Date: Sep. 28, 2006

(65) Prior Publication Data

US 2008/0302238 A1 Dec. 11, 2008

(30) Foreign Application Priority Data

Mar. 25, 2005 (FR) .................. 05 50788

(51) Int. Cl.
  *B01D 53/047* (2006.01)
(52) U.S. Cl. .................. 95/1; 95/96
(58) Field of Classification Search .......... 95/1, 95/8, 23, 96; 96/109, 115
See application file for complete search history.

(56) References Cited

U.S. PATENT DOCUMENTS

| 4,299,595 A | 11/1981 | Benkmann et al. |
| 4,693,730 A | 9/1987 | Miller et al. |
| 4,725,293 A | 2/1988 | Gunderson et al. |

(Continued)

FOREIGN PATENT DOCUMENTS

EP  0 375 220  6/1990

(Continued)

OTHER PUBLICATIONS

International Search Report for PCT/FR2006/050159, mailed Jul. 2006.

*Primary Examiner*—Frank M Lawrence
(74) *Attorney, Agent, or Firm*—Elwood L. Haynes

(57) ABSTRACT

The invention relates to a method of adjusting a unit that is used to control an installation for the adsorption treatment of a gas, comprising: at least a first member and a second member (2, 5, R0, . . . , R9) which receive a gas; a connection conduit (3, 4, 6, 7) which connects the first and second members to one another; and a valve on the connection conduit, which is closed and opened selectively in accordance with a variable valve-opening parameter. The control unit controls the opening of the valve according to the opening parameter on the basis of: an earlier opening parameter for the valve, a provisional valve opening parameter and at least one correction parameter. The inventive method comprises a step (a) in which the correction parameter is adjusted as a function of the installation and flow parameters.

14 Claims, 8 Drawing Sheets

U.S. PATENT DOCUMENTS

| | | | |
|---|---|---|---|
| 4,761,165 A * | 8/1988 | Stocker et al. ................. | 95/22 |
| 4,927,434 A * | 5/1990 | Cordes et al. ................... | 95/15 |
| 5,258,056 A * | 11/1993 | Shirley et al. .................. | 95/22 |
| 5,407,465 A | 4/1995 | Schaub et al. | |
| 6,277,174 B1 * | 8/2001 | Neu et al. ....................... | 95/12 |
| 6,733,568 B2 | 5/2004 | De-Souza et al. | |
| 2004/0055462 A1 | 3/2004 | Monereau | |

FOREIGN PATENT DOCUMENTS

| | | |
|---|---|---|
| EP | 0 925 821 | 6/1999 |
| EP | 1 114 666 | 7/2001 |
| EP | 1 336 910 | 8/2003 |
| WO | WO 98 56488 | 12/1998 |

\* cited by examiner

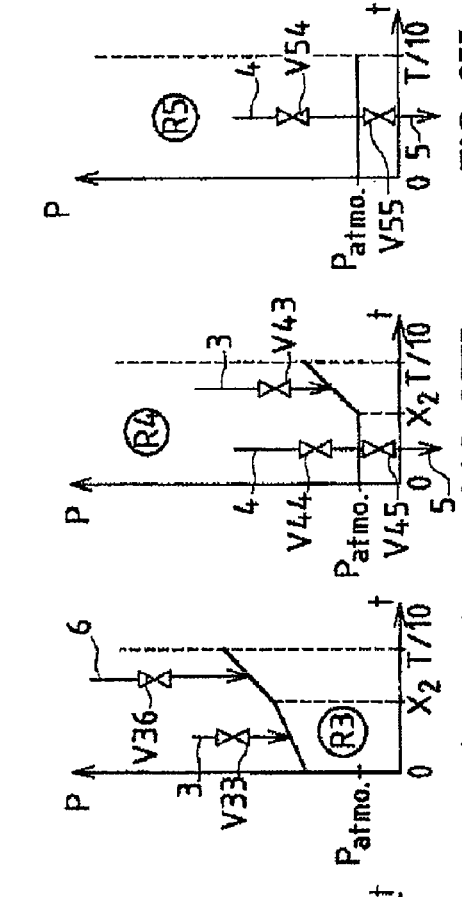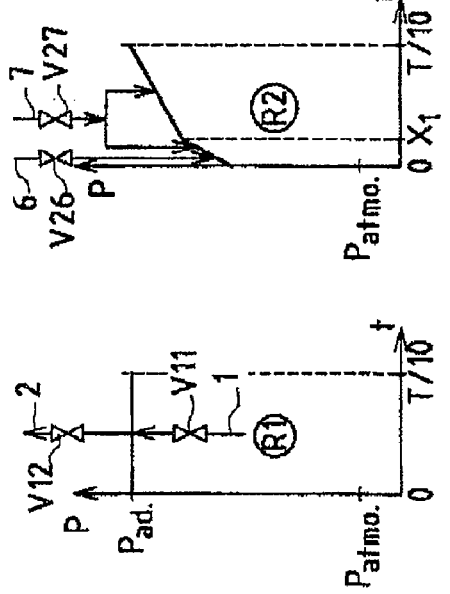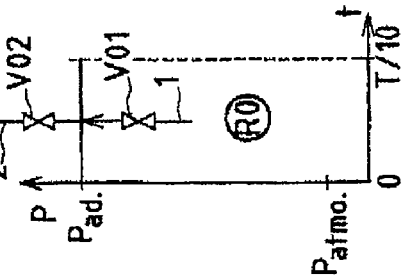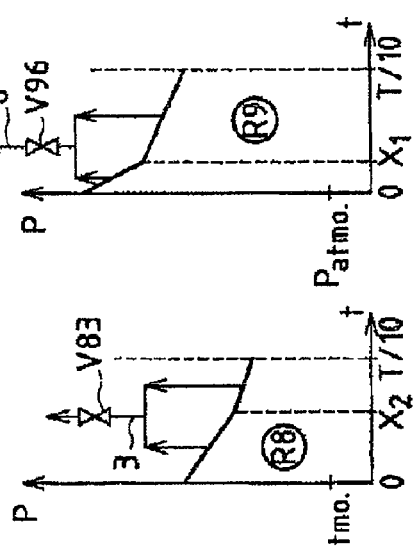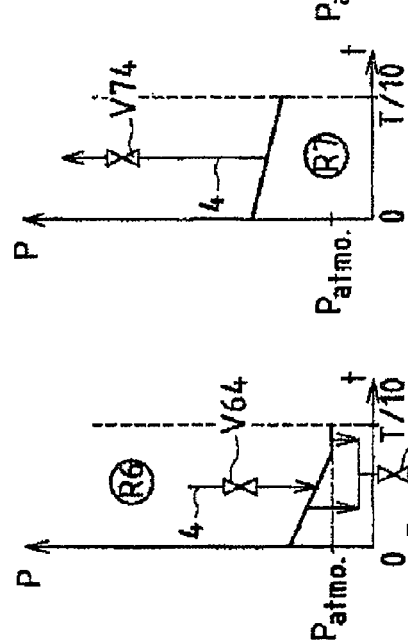

METHOD OF ADJUSTING AN INSTALLATION FOR THE ADSORPTION TREATMENT OF A GAS

This application is a 371 of International PCT Application PCT/FR 2006/050159, filed Feb. 23, 2006.

BACKGROUND

The present invention relates to methods for adjusting an installation for the treatment by adsorption of a gas subjected to a flow through said installation and to methods for treating gases by adsorption.

Document EP-A-1 336 910 describes an example of such a treatment installation, conventionally denoted by the acronym PSA (Pressure Swing Adsorption). Such an installation comprises various members receiving a gas, such as at least two cylinders comprising an adsorbent (ten cylinders in the example of the document cited), each cylinder comprising one or more layers of adsorbents, such as for example, and in a nonlimiting manner, a molecular sieve, of active carbon or alumina, a feed line conveying a gas mixture to the installation, a production line delivering a purified gas from the installation, an offgas line delivering a gas from the installation containing impurities of the incoming gas. Furthermore, the abovementioned members are connected together by lines each equipped with at least one valve for allowing or preventing the passage of gas between two members.

Such an installation provides full satisfaction. However, to guarantee the service life of the installation and/or the quality of the gas produced, and/or the quality of the gas flow produced, special care must be paid to the flow of the gas in the installation.

For this purpose, according to the invention, a method is provided for adjusting a control unit of an installation for treating gases by adsorption, said installation being suitable for implementing a method for producing gas during which a feed gas laden with impurities is supplied to the installation, for producing at least one gas issuing from the purification of the feed gas, said production method comprising a plurality of steps, during which a gas is subjected to a flow in said installation, said flow having a number of characteristic flow parameters, said installation comprising a plurality of members:
a feed line conveying a feed gas to be purified by adsorption,
a production line conveying a purified gas,
a removal line conveying an offgas, containing the impurities of the feed gas,
a plurality of cylinders containing at least one adsorbent material, said installation further comprising:
a plurality of connecting lines, each connecting two of said members together,
a valve on each of said connecting lines, each valve being suitable for being selectively closed to prevent a flow of gas in the connecting line, or opened according to a variable opening parameter, to allow a flow of gas in the connecting line, a system being defined by two members connected together by a connecting line equipped with a valve, said installation having a number of characteristic installation parameters, and said control unit, suitable for ordering the opening of the valve according to an opening parameter for each system, for each step, for each system, a detection device suitable for measuring a measured value of a physical parameter of the gas flow for the system, said control unit being suitable for calculating, for each system, a forecasting parameter for opening the valve, a setpoint for said physical flow parameter, an error between a function of said setpoint and the function of said measured value, said control unit being suitable for ordering the opening of the valve according to said opening parameter for each system, for each step, on the basis of at least said forecasting parameter for opening the valve, and at least one correction parameter applied to said error, said adjustment method comprising a step (a) in which said correction parameter is adjusted according to said characteristic installation and flow parameters.

Thanks to these arrangements, the control unit can be adjusted once and for all based on characteristic parameters associated with the installation and the flow, thereby enabling the installation to be easily configured upon startup, and to be automatically reconfigured during a change in the feed gas, for example.

In preferred embodiments of the invention, one and/or another of the following arrangements can further be resorted to:

the correction parameter is a proportional correction parameter applied to an error between the function of the current setpoint and the function of the current measured value;

during the implementation of the gas production method, the control unit is suitable for ordering the opening of the valve further according to a previous opening parameter for the valve, a previous value of the forecasting parameter, said proportional correction parameter applied to an error between the function of a previous setpoint for the physical flow parameter and the function of a previous measured value for the physical flow parameter, and a second comprehensive correction parameter applied to said error between the function of a current setpoint for the physical flow parameter and the function of a current measured value for the physical flow parameter, during step (a) of the adjustment method, said second comprehensive correction parameter is adjusted according to said characteristic installation and flow parameters;

during the implementation of the gas production method, the control unit is suitable for ordering the opening of the valve further according to a previous opening parameter for the valve, and a previous value of the forecasting parameter, and in which the correction parameter is a comprehensive correction parameter applied to the error between the function of said previous setpoint and the function of said previous measured value, adjustment method in which, during step (a), said comprehensive correction parameter is adjusted according to the installation and flow parameters;

during the implementation of the gas production method, the control unit is suitable for ordering the opening of the valve further according to a maximum permissible value for said opening parameter.

According to another aspect, the invention relates to a method for producing gas by adsorption using an installation comprising a control unit adjusted by such an adjustment method, said gas production method comprising a plurality of distinct steps extending between a phase beginning and a phase ending, during each of which, for at least a system comprising a first and a second member, a connecting line connecting said first and second members together, a valve on said connecting line, a gas flowing between the first and second members during each step, the following steps are implemented repeatedly:

(b) the setpoint is calculated for the physical flow parameter, (c) using the detection device, said measured value of said physical flow parameter is measured, (d) the forecasting parameter for opening the valve is calculated as a function of time, of the characteristic installation and flow parameters, and of said setpoint for the physical flow parameter, and (e) the value of said opening parameter is calculated as a function of the correction parameter adjusted in step (a), applied to the error between the function of said measured value and the function of said setpoint for said physical flow parameter and of the forecasting opening parameter.

In preferred embodiments of the invention, one and/or another of the following arrangements can further optionally be resorted to:

an operating point of the system is measured at the beginning of a step, and during step (e), said error is calculated by applying to said measured value and to said setpoint a nonlinear function of normalization to the operating point;

the following steps are furthermore implemented repeatedly:

(f) a maximum permissible value is calculated for the opening parameter, as a function of time, of the characteristic installation and flow parameters, and of said measured value for the physical flow parameter, (g) said maximum permissible value is compared with the value calculated in step (e) and, if said maximum permissible value is lower than said calculated value, said maximum permissible value is used instead of said calculated value;

the first member is a first cylinder containing an adsorbent, the second member is a second cylinder containing an adsorbent, said production method comprising a balancing step during which a gas flows into the connecting line from the first to the second cylinder until a value of a pressure difference between the pressure in the second cylinder and the pressure in the first cylinder reaches a given value, and during which at least the steps (b) to (e) are implemented with, as the physical flow parameter, a pressure difference between the first and the second cylinder;

the first member is a first cylinder containing an adsorbent, the second member is a second cylinder containing an adsorbent, said production method comprising an elution step during which a gas flows into the connecting line from the first to the second cylinder to rinse said second cylinder, and during which at least the steps (b) to (e) are implemented with, as physical flow parameter, a pressure difference between the first and the second cylinder;

said installation comprises a production line delivering a gas produced by the installation, and a feed line conveying a gas supplied to said installation, the second member is a second cylinder containing an adsorbent, said production method comprising a final repressurization step during which a gas flows into a connecting line to the second cylinder to increase a pressure value in the second cylinder, and during which at least the steps (b) to (e) are implemented with, as physical flow parameter, a pressure difference between a first cylinder connected to one of the production and feed lines and the second cylinder;

the first member is a first cylinder containing an adsorbent, the second member is an offgas removal line, said production method comprising a depressurization step during which a gas flows into the connecting line between the first cylinder and the removal line until a low pressure level is reached for the first cylinder, and during which at least the steps (b) to (e) are implemented with, as physical flow parameter, a pressure difference between the first cylinder and the offgas removal line;

said installation further comprises a feed line conveying a gas supplied to said installation at a feed rate, a production line from the installation delivering a gas produced at a production rate, and a balancing cylinder, a gas flowing from the balancing cylinder to a second cylinder during a balancing step until a pressure difference between the pressure in the second cylinder and the pressure in the balancing cylinder reaches a given value, the first member is a first cylinder connected to one of the feed and production lines, the second member is said second cylinder said production method comprising a continuous repressurization step during which a gas flows into the connecting line between said line and the second cylinder until an operating pressure in the second cylinder is obtained, and during which at least the steps (b) to (e) are implemented with, as physical flow parameter, a difference between the production rate and the feed rate;

during at least one step of the production method, at least the step (e) is only implemented after a time lag at the start of the step of the production method, said time lag having a sufficient duration so that the physical flow parameter reaches a representative value.

According to another aspect, the invention relates to a program comprising program encoding means suitable for implementing such a method, when said program is run on a programmable machine.

According to a further aspect, the invention relates to a gas produced by such a method.

Other features and advantages of the invention will appear from the following description of one of its embodiments, provided as a nonlimiting example, with reference to the drawings appended hereto.

In these drawings:

FIGS. 3I to 3X are diagrams respectively associated with the adsorbers of the installation in FIG. 1 and illustrating one and the same cycle phase time of FIG. 2;

In the various figures, the same references denote identical or similar elements.

FIG. 1 shows an installation 10 for treating an impure gas flow, such as impure hydrogen. The installation is suitable for purifying this hydrogen flow from the impurities therein, such as moisture, carbon monoxide, nitrogen, methane, carbon dioxide, hydrocarbons, etc.

For this purpose, the installation 10 comprises a number of members containing gas, such as a feed line 1 conveying hydrogen to be purified, a purified hydrogen production line 2 and ten adsorbers, respectively referenced R1, R2, R3, . . . , R9 and R0. Each adsorber comprises a cylinder containing one or more adsorbent materials capable of retaining all or part of the abovementioned impurities when flushed by the hydrogen flow to be treated. This or these materials are regenerable, that is, they are capable of restoring the previously adsorbed impurities. For this purpose, the installation 10 comprises a line 5 for removal of the offgas laden with dissolved impurities issuing from the adsorbers which are regenerated. The installation 10 may also comprise a supply line conveying an elution gas GE, for example tapped off from the production line 2.

The installation 10 also comprises on the one hand connecting lines, including the line 7, between the abovementioned lines 1, 2 and 5 and the adsorbers R1 to R0, and on the other, connecting lines 3, 4 and 6 connecting the adsorbers R1 to R0 together, one of the connecting lines 4 being connected to the line supplying elution gas GE. The precise arrangement of the connecting lines 3, 4, 6 and 7 will appear more clearly in the description of the operation of the installation 10. Moreover, all these connecting lines are equipped with valves for controlling the flow of gas passing through them, whereof the arrangement will also appear in the description of the operation of the installation.

The installation 10 further comprises a unit 8 for controlling the valves of the adsorbers of the installation. The programming and operating details of this unit will be described in further detail below.

Detection devices are placed in the installation, such as a pressure sensor for each cylinder, or a flow sensor for each line.

Figure 1:
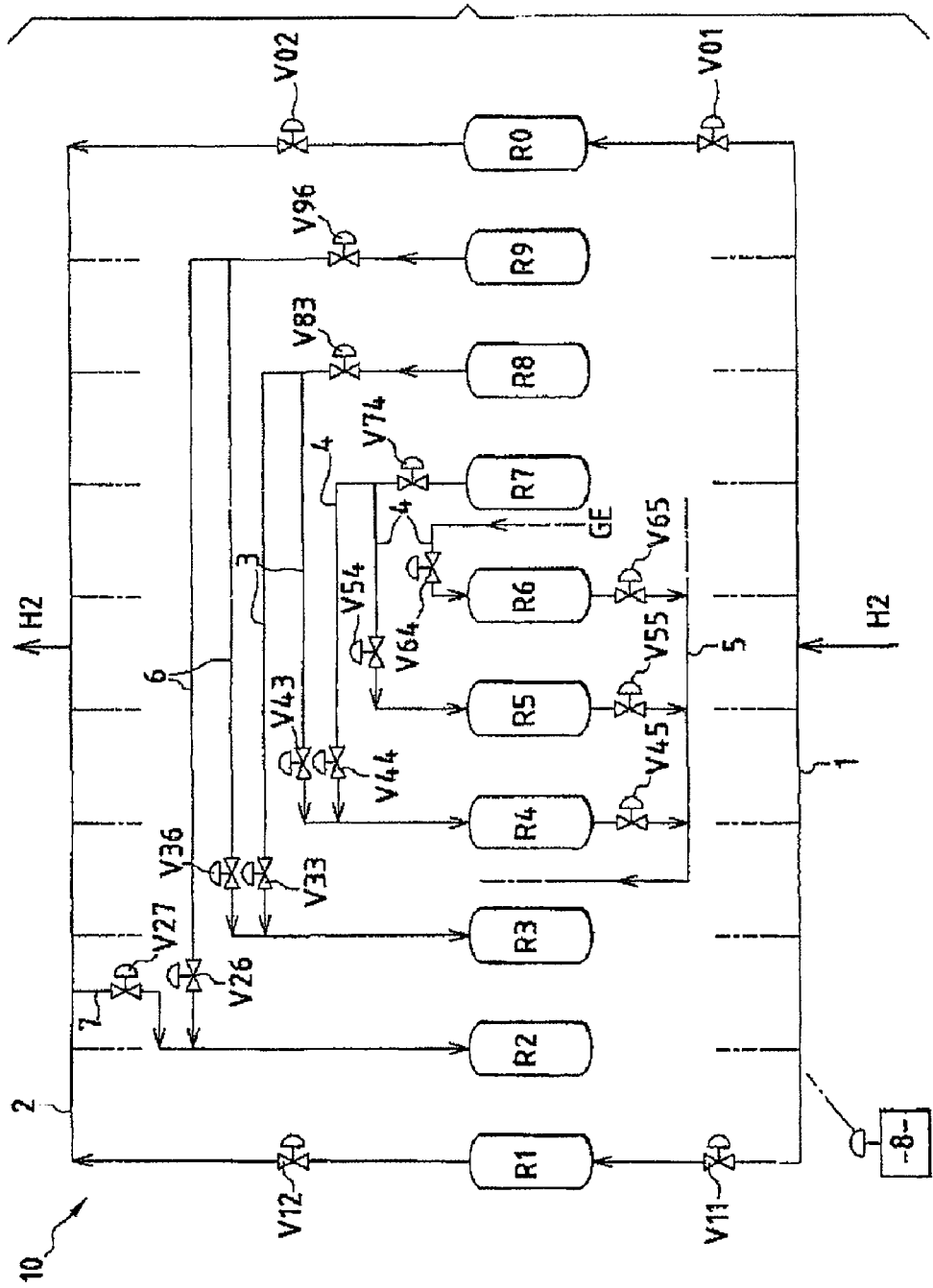
FIG. 1 is a schematic view of an installation for treating a gas by adsorption.
Figure 2:
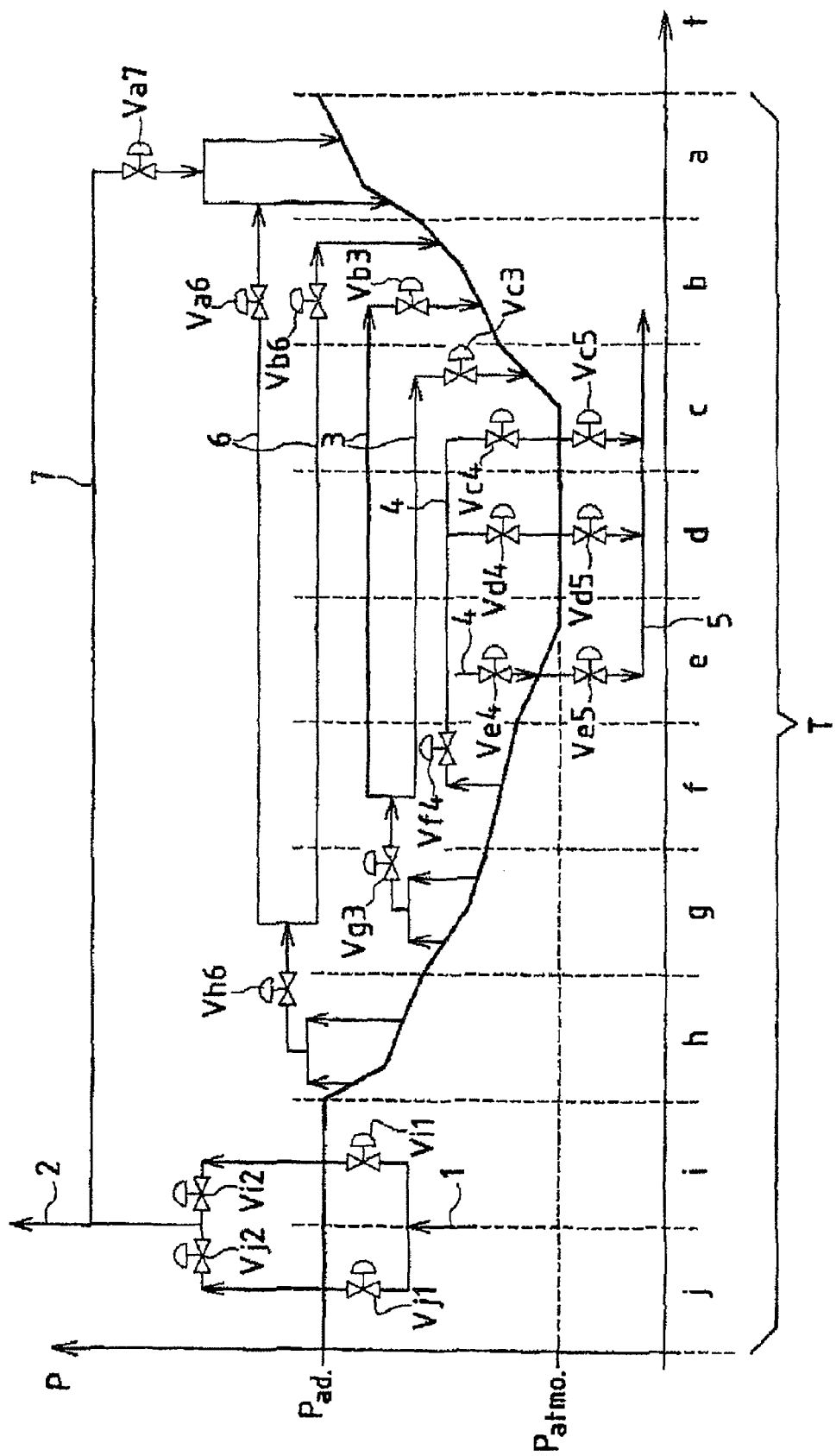
FIG. 2 is a diagram of an operating cycle of the adsorbers of the installation FIG. 1, in which various operating phase times a, b, . . . , j are shown.

FIG. 2 shows an operating cycle of the installation 10. In this figure, where the times t are plotted on the x-axis and the absolute pressures P on the y-axis, the lines directed by arrows indicate the movements and destinations of the gas streams, and, furthermore, the flow direction in the adsorbers R1 to R0 respectively:

when an arrow points in the increasing direction of the y-axis (towards the top of the diagram), the flow is said to be in cocurrent in the adsorber. If the arrow pointing upward is located below the line indicating the pressure in the adsorber, the stream enters the adsorber via the inlet end thereof; if the arrow pointing upward is located above the line indicating the pressure, the stream exits from the adsorber via the outlet end thereof, the inlet and outlet ends being respectively those of the gas to be treated and the gas withdrawn in the production phase;

when an arrow points in the decreasing direction of the y-axis (toward the bottom of the diagram), the flow is said to be in countercurrent in the adsorber. If the arrow pointing downward is located below the line indicating the pressure of the adsorber, the stream exits from the adsorber via the inlet end thereof; if the arrow pointing downward is located above the line indicating the pressure, the stream enters the adsorber via the outlet end thereof, the inlet and outlet ends always being those of the gas to be treated and the gas withdrawn in the production phase.

Each adsorber R1 to R0 follows the cycle in FIG. 2, being offset from the adsorber preceding it by a duration called "phase time" and equal to the duration T of the cycle divided by the number of adsorbers in operation (divided by ten in the present case). The cycle in FIG. 2 therefore comprises ten phase times and illustrates the "phase time/adsorber" duality, that is, that at any time of the operation of the installation 10, each adsorber is in a different phase time, which is equivalent to saying that the operating status of an adsorber is, at any time of the operation of the installation, determined by the phase time in which this adsorber is positioned.

The operation of the installation 10 is now first explained by merely describing the operation of the adsorbers R1 to R0 during a single phase time, it being understood that the operation of the adsorbers during the rest of the cycle is inferred by repetition by offsetting the order of the adsorbers.

For this purpose, we can consider for example the phase time during which the adsorber R1 is said to be the "master", that is, that it begins its adsorption phase at a high pressure $P_{ad}$, higher than the atmospheric pressure $P_{atom}$, as shown in FIG. 3I. Concomitantly, the adsorber R2 follows the diagram in FIG. 3II, the adsorber R3 follows the diagram in FIG. 3III, and so on, up to the adsorber R0 which follows the diagram in FIG. 3X.

To facilitate the reading, only the valves opened during at least part of this phase time, identified for convenience between times t=0 and t=T/10, are shown in FIGS. 2 and 3I to 3X. For convenience of numbering, these valves are denoted for the description of this installation by the letter V followed by two characters X, Y according to the following conventions:

X is the number of the adsorber with which the valve is associated, and

Y is the number of a set of valves having the same function and associated with one of the lines of the installation, the number 1 being associated with a "feed" function of the feed line 1, the number 2 being associated with a "production" function of the production line 2, the number 3 being associated with a "lower pressure balancing" function of the connecting lines 3, the number 4 being associated with an "elution" function of the connecting lines 4, the number 5 being associated with an "offgas removal" function of the line 5, the number 6 being associated with a "higher pressure balancing" function of the connecting lines 6, and the number 7 being associated with a "final repressurization" function of the connecting line 7.

It is important to note that the arrangement of the valves for implementing the operation of the installation 10 is deliberately simplified, both for convenience of description and of representation; particular arrangements, comprising in particular fewer valves but comprising transverse lines for the entire installation for example, are within the scope of a person skilled in the art, without extending beyond the scope of the invention.

Prior to the beginning of the phase time shown in FIGS. 3I to 3X, that is before t=0, the valves V01, V02, V45 and V55 are open during at least the end of the phase time preceding the phase time considered shown in FIGS. 3I to 3X. During the latter phase time, the adsorbers R1 and R0 are in adsorption, the other adsorbers being in regeneration.

More precisely, at time t=0:

in addition to the valves V01 and V02, the valves V11 and V12 are open to ensure the production of part of the purified hydrogen flow;

the valves V26, V27 and V96 are open to permit at least part of the flows issuing respectively from the adsorbers R1, R9 and R0 to recompress the adsorber R2;

the valves V33 and V83 are open to permit the recompression of the adsorber R3 by the flow issuing from the adsorber R8;

the valves V64 and V65 are open to permit the adjustment of the pressure of the adsorber R6 to the low pressure of the cycle and to permit the elution of the adsorbent material in the cylinder R6; and in addition to the valve V55, the valves V54 and V74 are open to permit the elution of the adsorber R5 by the flow issuing from the adsorber R7.

Furthermore, and substantially concomitant with this time t=0, the production valves of the adsorber R9, which was in adsorption during the phase time preceding the phase time described in FIGS. 3I to 3X, are closed.

Then, from time t=X1 where the pressure in the adsorber R2 is substantially equal to the pressure in the adsorber R9:

the valves V26 and V96 are closed, and the subsequent recompression of the adsorber R2 is accordingly slower.

Then, from time t=X2 where the pressure in the adsorber R3 is substantially equal to the pressure in the adsorber R8:

the valve V33 is closed and the valve V43 is opened to permit the beginning of the repressurization of the adsorber R4;

the valves V44 and V45 are closed, the entire flow issuing from the adsorber R7 accordingly feeding the adsorber R5; and the valves V36 and V96 are opened to permit further recompression of the adsorber R3 by the flow issuing from R9.

Finally, at time t=T/10 where the pressure in the adsorber R2 is substantially equal to the pressure in the adsorber R1, the valves V27, V96, V83, V74, V33, V43 and V36 are closed to switch from the phase time described so far to the next phase time.

Thus, although the graph in FIG. 2 appears to show two connecting lines 6 and 3, it is more accurate to consider that it actually concerns a single line successively conveying two different flows during the same phase time.

The operation of the installation 10 during the other phase times of the cycle can be inferred from the above operation, considering the adsorber R2 as master during the next phase time, followed by the adsorber R3, and so on, up to the adsorber R0.

All the control operations on the valves of the installation, for the 10 cycle phase times, form what is commonly called a unit control sequencer 8, which is to be implemented.

For this purpose, parameters are introduced: each successive cycle phase time is associated with a parameter for identifying the operating status of the adsorber which is in this phase time.

Thus, over the phase time shown in FIG. 2, the status parameter j is associated with the phase time in which the adsorber begins its adsorption, the status parameter i is associated with the phase time which follows, and in which the adsorber terminates its adsorption, the status parameter h is associated with the phase time which follows and in which the adsorber begins its depressurization, and so on for the parameters g, f, e, d, c, b, and a. These status parameters are indicated on the x-axis of the diagram in FIG. 2. It is therefore necessary to introduce as many parameters as there are phase times.

Furthermore, these parameters are called "mobile", in the sense that they can correspond to any one of the ten adsorbers, according to the moment considered in the cycle. Thus, if at a given moment, the parameter j corresponds to the adsorber R1 (j=1), after a period equivalent to one-fifth of the cycle time T, this parameter j will correspond to the adsorber R3 (j=3).

A parameterized sequence of steps is then defined for controlling the installation 10 only during a given phase time, each adsorber not being identified by its number, but by the identification parameter of the operating status of this adsorber during the period of time relative to the phase time selected. In other words, this is equivalent to describing the operation of the installation over a given phase time, in the same way as it has been described with regard to FIGS. 3I to 3X, but by identifying each adsorber by one of the variable parameters a, . . . , j, according to the phase time selected.

Thus, at each phase time, a set of systems can be defined in the installation, which selectively perform a production, elution, depressurization, continuous repressurization or final repressurization function, and which each comprise at least two members connected together by a connecting line equipped with an open valve, in a variable manner over the phase time, under the control of the control unit 8.

The opening of each of the valves of the installation is characterized by a valve opening parameter. For the example of the description made here, the parameter used is obtained from the CV of the valve, parameter proportional to the flow rate passing through the valve. Based on the CV, the valve opening parameter (percentage opening) is obtained, for example by the application of a linear or a nonlinear equation supplied by the valve manufacturer. However, any type of parameter appropriate to the framework of the invention can be used, such as the position of the valve, or another.

Figure 4:
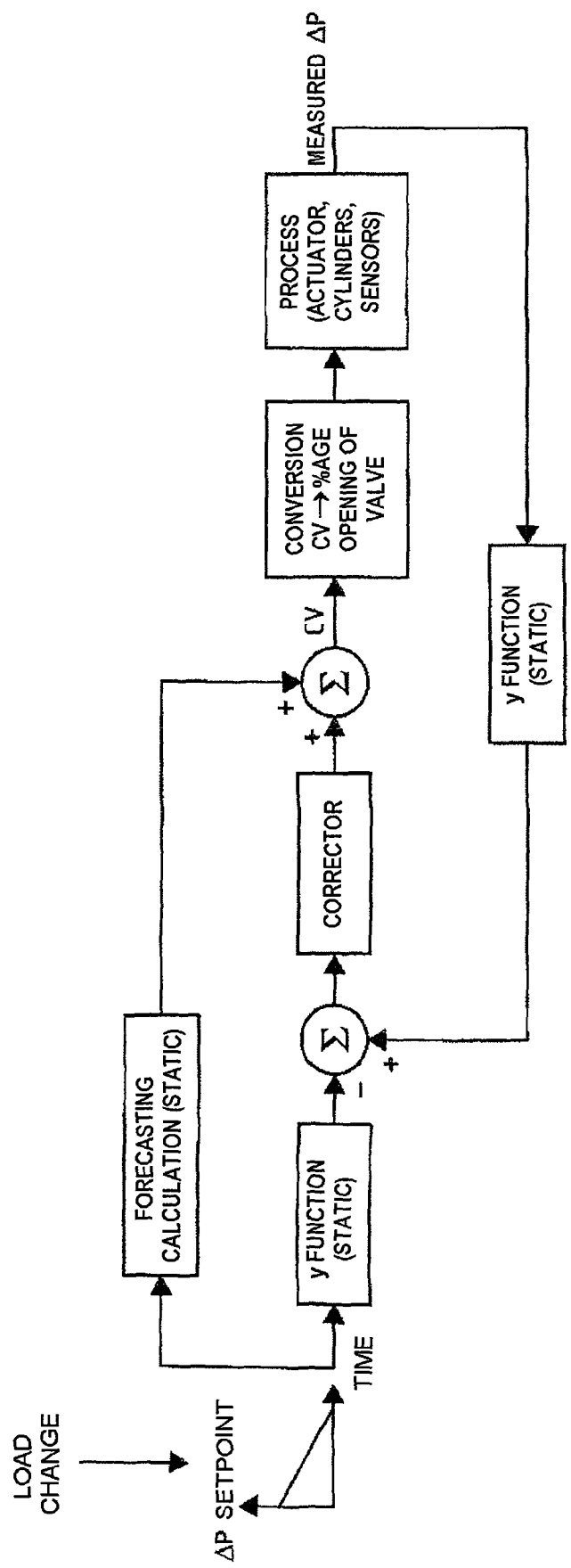
FIG. 4 shows a schematic diagram of a valve control method.

For each of the valves placed on a connecting line connecting two members together such as two adsorbent cylinders or one adsorbent cylinder and a line, the method described below is implemented, shown synthetically in FIG. 4.

Repeatedly during each step:

a setpoint is calculated for a physical flow parameter such as the pressure difference between the two members, based on the setpoint, a forecasting CV is calculated for the valve in question, a real value of the physical flow parameter is measured, such as a real pressure difference between the two adsorbent cylinders, the CV control to be applied to the valve is calculated based on the forecasting CV, and on a correction parameter applied to the error between a function of the measured value and the function of the setpoint for the physical flow parameter, such as the pressure difference measured and the setpoint for the pressure difference, the opening of the valve is modified (if necessary).

It should be noted in particular that the regulation can be implemented according to the pressure difference, or to an appropriate function y of this pressure difference, y being for example the identity function, a normalization function, a square root, or other.

The physical flow parameter may be a pressure difference, a flow rate, or any other appropriate parameter. For example, use can be made as the physical flow parameter, in the context of the adjustment method, of the rate of attrition in a cylinder supplying the gas during a balancing step, or the outgoing flow rate for the elution or depressurization steps of the production method.

The correction parameter or parameters are set once and for all, for each step selected from an elution, balancing, depressurization, continuous repressurization or final repressurization step, during the implementation of a method for adjusting the control unit of the installation during which the correction parameter or parameters are defined as explained below in conjunction with FIGS. 6 to 12.

Figure 5B:
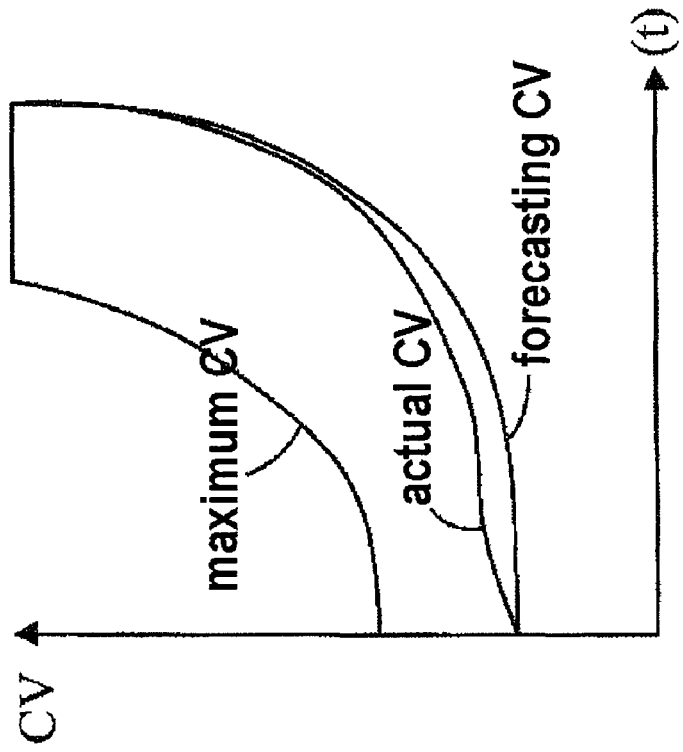
FIGS. 5a and 5b are time graphs respectively showing a pressure deviation setpoint and the CV over time for a balancing step.
Figure 5A:
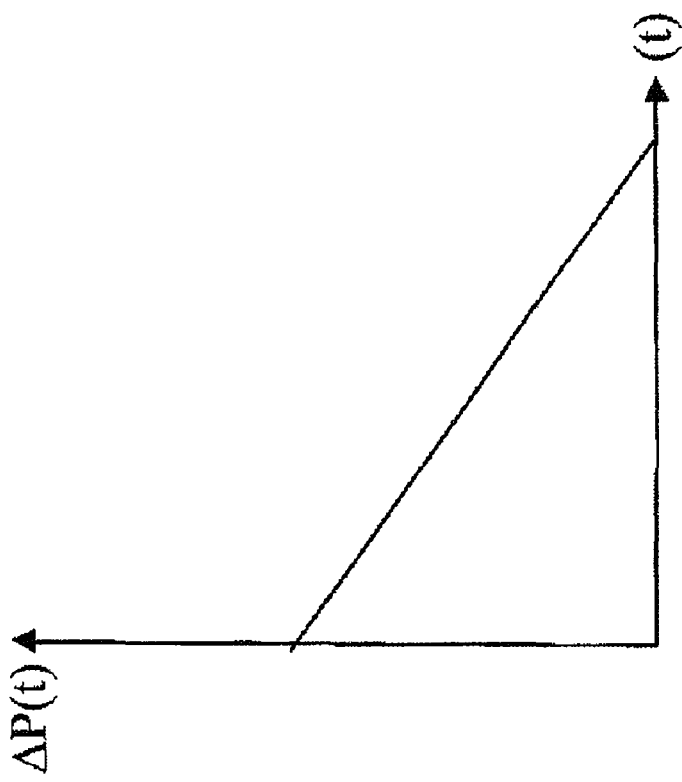

For each step, the setpoint is calculated at each time t, for example linearly, as shown in FIG. 5a, between the pressure difference measured at the start of the step time and the pressure difference setpoint to be obtained at the end of the step time:

$$\Delta P(t) = \Delta P_{init} + (\Delta P_{final} - \Delta P_{init})\frac{t}{Tsp},$$

where $\Delta P(t)$ is the pressure difference at time t, $\Delta P_{init}$ is the pressure difference at the start of the step time, $\Delta P_{final}$ is the pressure difference setpoint at the end of the step time, t is the timer of the step considered, and Tsp is the anticipated duration of the step considered.

However, the setpoint could be obtained for any other appropriate decreasing function such as a square, an exponential, or another.

In certain embodiments, it may be provided for the CV to be kept constant during a transitory period at the start of each step, for a few tenths of a second to a few seconds (for example from 1 to 5 seconds), before implementing the method described here. During this transitory interval, the flow rate and the pressure variation can be established.

Furthermore, for safety aspects, it may be useful, in certain applications, to ensure by construction that the CV control applied to the valve does not exceed a maximum permissible CV corresponding to an attrition rate of the gas in the cylinders. The variation in these values over time is shown for example, in FIG. 5b for a balancing step.

Therefore, in calculating the CV control, a comparison is included of the CV control calculated with the maximum permissible CV for the valve, also calculated to comply with a satisfactory flow rate in the valve, and the maximum CV is sent to the valve if the calculated CV control is higher than the maximum CV.

In estimating the CV, it may, for example, be possible to use the model developed by the Instrument Society of America (ISA) in ISA-S75.01-1985 (R 1995) "Flow Equation for Sizing Control Valves", and giving an equation between CV, valve flow rate, pressure upstream and downstream of the valve. Alternatively, any other appropriate equation can be used, based on a standard, experiment or other.

The ISA model specifies that these parameters are connected by the formula:

$$CV(t) = \frac{Q}{395 F_p} \frac{1}{P_{upstr}(t) \cdot Y} \sqrt{\frac{S_g T Z}{x(t)}}, \quad (1)$$

where:

Q is the flow rate of the valve (Sm³/h), $P_{upstr}$ is the pressure upstream of the valve [bara], Y is the valve expansion factor $Y=(1-x(t)/3F_k x_t)$, bound between 0.67 and 1, $X=\Delta P/P_{upstr}$, x being saturated at $x_t$ (corresponding to x for a critical gas flow) [dimensionless], $\Delta P$ is the pressure difference between the upstream pressure and the downstream pressure [bara], $F_p$ is a geometry factor associated with the adjustment of the valve to the pipe [dimensionless].

$F_k = k/1.40$ where $k = C_p/C_v$ is the ratio of the specific heats of the gas [dimensionless], $S_g$ is the specific gravity of the gas compared to air [dimensionless], T is the upstream temperature of the gas [K], and Z is the compressibility factor of the gas [dimensionless].

Obviously, any other appropriate equation can be used associating CV, flow rate and pressure, particularly if the valves are equipped with silencers.

For the example described here, $F_p$, Z and $F_k$ are estimated substantially equal to 1, but any appropriate equation can be used for the values of these parameters.

The equation presented serves to calculate the forecasting CV from the setpoint $\Delta P(t)$ (cf. FIG. 5a) as a function of the other parameters of the valve. However, in the context of the invention, the flow rate could also be calculated, for example, as a function of the valve parameters such as the CV.

FIGS. 6 to 10 show models of various steps of the gas production method each serving to determine a correction parameter value to be adjusted for the control unit during the implementation of the adjustment method of the invention.

Figure 6:
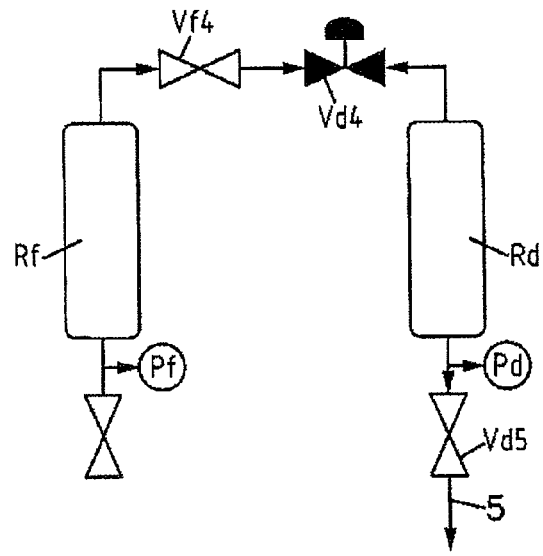
FIG. 6 shows a system subjected to an elution step.

FIG. 6 shows an elution step between the cylinder Rf and the cylinder Rd (FIG. 2). The valves Vf4 and Vd5 are fully open during this step, the valve Vd4 being controlled.

Theoretically, it can be written that the pressure Pf in the cylinder Rf is subject to the equation:

$$\frac{dPf}{dt} = -\frac{Q_{d4}}{3600 V_{eq}}, \quad (2)$$

where $V_{eq}$ is the equivalent volume (flow rate of hydrogen desorbed per bar) [Nm³ H₂/bar].

The pressure Pd of the cylinder Rd is the pressure of the offgas removal line 5, which can be considered constant, and in consequence $dPf/dt = d\Delta P/dt$.

By combining equations (1), (2) and the expression of Y, a CV forecasting term is obtained for the elution step:

$$CV(t) = \frac{Q_{d4}}{395 F_p} \sqrt{\frac{S_g T Z \left( P_{offgas,init} + \Delta P_{init} - \frac{Q_{d4}}{3600 V_{eq}} t \right)}{\Delta P_{init} - \frac{Q_{d4}}{3600 V_{eq}} t}} \cdot \frac{1}{P_{offgas,init} + \Delta P_{init} - \frac{Q_{d4}}{3600 V_{eq}} t - \frac{\Delta P_{init} - \frac{Q_{d4}}{3600 V_{eq}} t}{3 F_k x_t}}, \quad (3)$$

where:

$Q_{d4} = (\Delta P_{init} - \Delta P_{final,SP}) 3600 V_{eq}/T_{SP}$, $\Delta P_{final,SP}$ is the final pressure difference setpoint for the elution step, $\Delta P_{init}$ is the pressure difference measured at the start of the elution step, $\Delta P_{offgas,init}$ is the pressure in the line 5, measured at the start of the elution step, and $T_{SP}$ is the duration setpoint of the elution step.

For controlling the valve, an equation is obtained from equations (1) and (2) between the measured variable (pressure) and the control variable (CV):

$$\frac{d\Delta P}{\sqrt{\Delta P}\sqrt{P_{offgas,init}+\Delta P}} = -\left[\frac{395 YF_P}{3600 V_{eq}}\sqrt{\frac{1}{S_g TZ}}\right] = CV(t)dt \quad (4)$$

This equation is solved by considering Y for an elution step as constant, in:

$$\operatorname{arcsinh}\left(\sqrt{\frac{\Delta P}{P_{offgas,init}}}\right) = \operatorname{arcsinh}\left(\sqrt{\frac{\Delta P_{init}}{P_{offgas,init}}}\right) - \frac{1}{2}\frac{395 YF_P}{3600 VW_{eq}}\sqrt{\frac{1}{S_g TZ}}\left[\int_0^t CV\, dt\right]_{saturated} \quad (5)$$

where the saturation indicates that $\Delta P$ cannot fall below 0. Equation (5) is written, in terms of transfer function, as a saturated integral system:

$$\operatorname{arcsinh}\left(\sqrt{\frac{\Delta P}{P_{offgas,init}}}\right) = -K\left[\frac{CV}{s}\right]_{saturated} \quad (6)$$

where $$K = \frac{1}{2}\frac{395 YF_P}{3600 V_{eq}}\sqrt{\frac{1}{S_g TZ}} \quad (7)$$

The factor K thus obtained depends exclusively on the characteristic parameters of the installation $F_P$ and $V_{eq}$, and the characteristic flow parameters $S_g$, T and Z. Furthermore, for an elution step, Y is considered as constant and equal to 0.67.

The system is linearized with regard to CV by regulating, not with respect to $\Delta P$ but with respect to a nonlinear function $v(\Delta P)=(\operatorname{arcsinh}\,[\sqrt{\Delta P/P_{offgas,init}}])$, or approximately with respect to $y(\Delta P)=[\sqrt{(\Delta P/P_{offgas,init})}]$.

Use can be made for example of the Ziegler-Nichols method, which serves to determine the parameters of a PID corrector for an integrator system of the type $G(s)=e^{-\theta s}.K/s$ where $\theta$ is a lag. If the proportional gain corrector $K_p$ is defined, this method gives $K_p=1/K\theta$.

$\theta$ may, for example, be determined by simulation, by disturbing the process to be controlled. This parameter may, for example, be selected between about 5 seconds and 100 seconds. A sufficiently large choice of $\theta$ serves to avoid excessive CV fluctuations. A sufficiently small choice of $\theta$ serves to reach the required pressures.

It is also possible to add an integral term $K_I$ in the pressure corrector. $K_I$=ratio×Kp is selected, such as for example $K_I$=0.1$K_p$. Accordingly, $K_I$ also depends exclusively on the characteristic installation and flow parameters.

The real CV is accordingly written:

$$CV=\max[z^{-1}CV+(1-z^{-1})(CV_{forecast}+K_p\epsilon)+K_I\epsilon; 0] \quad (8)$$

where:

$\epsilon=y_{mes}-y_{sp}$ where $y_{mes}$ is the function of the measured pressure difference $\Delta P$ used for the regulation (for example $y=\operatorname{arcsinh}[\sqrt{(\Delta P/P_{offgas,init})}]$ or $y=\sqrt{(\Delta P/P_{offgas,init})}$, and $y_{sp}$ is the same function applied to the pressure difference setpoint ($P_{offgas,init}$ here is used to normalize the error between the pressure difference setpoint and the measured pressure difference), and the operator $z^{-1}$ is the lag operator of a period for a sampled system.

The use of a nonlinear function y serves to improve the robustness of the correction parameters faced with disturbances.

It should be noted here that in the case of a purely proportional system, where $K_I$ is selected as zero, equation (8) is written:

$$CV=\max[CV_{forecast}+K_p\epsilon; 0], \quad (8')$$

The valve opening parameter is directly obtained from the forecast valve opening parameter and the proportional correction parameter applied to the error between the function of the current setpoint and the function of the current measured value.

In the proportional-integral case, the CV is also obtained from an integral correction parameter applied to this error, from a previous value of the opening parameter, from a previous value of the forecast opening parameter and the proportional correction parameter applied to a previous value of the error.

In an alternative embodiment, one can also ensure that a regulation problem will not lead to a flow at an excessive speed in the cylinders. Such a regulation problem could, for example, be due to an excessively high adjustment of a corrector or the failure of a sensor whereof the measurement is used by the corrector. For this purpose, the $CV_{max}$ is calculated which corresponds to a maximum permissible CV for the valve during the step. For example, the $CV_{max}$ corresponds to the CV permitting the flow of the gas in the cylinder at a predefined fraction x of the attrition rate, which may be approximated by the Ledoux formula (for example X=60% for the elution step described here).

The speed of the gas in the cylinder may, for example be written:

$$v = \frac{Q}{3600 S_{ads}}\frac{1.01325}{P_{ads}}\frac{T_{ads}}{273.15}, \quad (9)$$

where:

v is the speed of the top or bottom of the cylinder [m/s],

Q is the flow rate passing at the top or the bottom of the cylinder [Nm³/h], $T_{ads}$ is the temperature in the cylinder [K], $P_{ads}$ is the pressure in the cylinder [bara], and $S_{ads}$ is the cross section of the cylinder [m²].

Furthermore, the Ledoux velocity can be written:

$$v_{Ledoux} = \sqrt{D_e \rho_{ads}\frac{1.01325 T_{ads}}{273.15 \rho_{gas} P_{ads}}} \quad (10)$$

where $D_e$ is the mean equivalent diameter of the adsorbent in the cylinder [m], $\rho_{ads}$ is the mean density of the adsorbent in the cylinder [kg/m³], and $\rho_{gas}$ is the gas density [kg/Nm³].

Equations (9) and (10) are used to obtain a maximum flow rate value not to be exceeded in the cylinder. By combining with (1) and $\rho_{gas}=1.29\, S_g$, an expression of the permissible $CV_{max}$ for the valve is obtained:

$$CV_{MAX}(t) = \frac{x \cdot 0.4 \cdot 3600 S_{ads}}{395 F_p Y} \sqrt{D_e \frac{\rho_{ads}}{1.29} \cdot \frac{273.15}{1.01325} Z} \frac{1}{\sqrt{\Delta P_{mes}(t)}} \quad (11)$$

It should be noted that the $CV_{MAX}$ thus defined does not depend on the density of the gas, which is advantageous in case of an unidentified problem with a gas.

The $CV_{MAX}$ can be used in the context of the regulation, by modifying, according to this alternative embodiment, equation (8) as follows, to install the saturation at $CV_{MAX}$ in the integrator:

$$CV = \min[\max[z^{-1}CV + (1-z^{-1})(CV_{forecast} + K_p \epsilon) + K_i \epsilon;\ 0];\ CV_{MAX}], \quad (12).$$

The pressure of the valve $V_{d4}$ is thereby adjusted.

Figure 7:
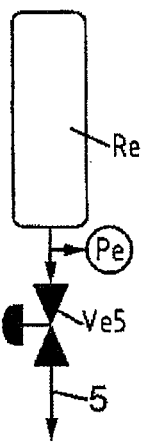
FIG. 7 shows a system subjected to a depressurization step.

FIG. 7 shows a depressurization step of the cylinder Re (FIG. 2). The valve Ve5 is controlled during this step. The second member here is the offgas removal line 5.

Theoretically, it can be written that the pressure Pe of the cylinder Re is subject to the equation:

$$\frac{dPe}{dt} = -\frac{Q_{e5}}{3600 V_{eq}} \quad (13)$$

The equivalent volume can be used here, but since the gas leaving the cylinder is relatively different from pure hydrogen, the estimation of this quantity can also be refined.

The depressurization step is fairly similar to the elution step, with the difference that the final pressure difference setpoint is zero. In consequence, a forecasting CV term is obtained for the depressurization step:

$$CV(t) = \frac{Q_{e5}}{395 F_p} \sqrt{\frac{S_g T Z \left( P_{offgas,init} + \Delta P_{init} - \frac{Q_{e5}}{3600 V_{eq}} t \right)}{P_{offgas,init} + \Delta P_{init} - \frac{Q_{e5}}{3600 V_{eq}} t - \frac{\Delta P_{init} - \frac{Q_{e5}}{3600 V_{eq}} t}{3 F_k x_t}}} \quad (14)$$

where:

$$Q_{e5} = (\Delta P_{init} - \Delta P_{final,SP}) 3600\, V_{eq}/T_{SP},$$

$\Delta P_{final,SP}$ is the final pressure difference setpoint for the depressurization step ($=0$), $\Delta P_{init}$ is the pressure difference measured at the start of the depressurization step, $P_{offgas,init}$ is the pressure in the line 5, measured at the start of the depressurization step, and $T_{SP}$ is the duration setpoint of the depressurization step.

For controlling the valve, the following can also be written:

$$\operatorname{arcsinh}\left( \sqrt{\frac{\Delta P}{P_{offgas,init}}} \right) = -K \left[ \frac{CV}{s} \right]_{saturated} \quad (15)$$

where $$K = \frac{1}{2} \frac{395 Y F_p}{3600 V_{eq}} \sqrt{\frac{1}{S_g T Z}}. \quad (16)$$

The factor K thus obtained depends exclusively on the characteristic installation parameters $F_p$ and $V_{eq}$, and the characteristic flow parameters $S_g$, T and Z. Furthermore, for a depressurization step, Y is considered as constant and equal to 0.83.

In consequence, the equations developed for elution are also valid for the depressurization step, that is:

$$CV = \max[z^{-1}CV + (1-z^{-1})(CV_{forecast} + K_p \epsilon) + K_i \epsilon;\ 0], \quad (17),$$

and, in the alternative:

$$CV = \min[\max[z^{-1}CV + (1-z^{-1})(CV_{forecast} + K_p \epsilon) + K k_i \epsilon;\ 0];\ CV_{MAX}], \quad (18),$$

where x is for example equal to 160% for the depressurization step.

The pressure of the valve $V_{e5}$ is thereby adjusted.

Figure 8:
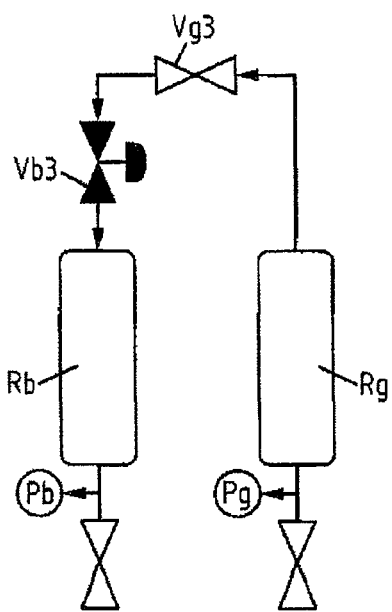
FIG. 8 shows a system subjected to a balancing step.

FIG. 8 shows a balancing step (without continuous repressurization) between the cylinder Rg and the cylinder Rb (FIG. 2). The gas flows from the cylinder Rg to the cylinder Rb until a given pressure difference is obtained, possibly zero, between these two cylinders. The valve Vg3 is fully open during this step, the valve Vb3 being controlled.

Theoretically, it can be written that the pressures of the cylinders Rb and Rg are subject to the equations:

$$\frac{dPb}{dt} = \frac{Q_{b3}}{3600 V_{eq}}, \quad (19),$$

and $$\frac{dPg}{dt} = -\frac{Q_{b3}}{3600 V_{eq}} \quad (20)$$

By combining the equations (1), (19) and (20), a CV forecasting term is obtained for the balancing step:

$$CV(t) = \frac{Q_{b3}}{395 F_P} \sqrt{\frac{S_g T Z \left( P_{g,init} - \frac{Q_{b3}}{3600 V_{eq}} t \right)}{P_{g,init} - \frac{Q_{b3}}{3600 V_{eq}} t - \frac{\Delta P_{init} - \frac{2 Q_{b3}}{3600 V_{eq}} t}{3 F_k x_t}}}, \quad (21)$$

where:

$$2 \cdot Q_{b3} = (\Delta P_{init} - \Delta P_{final,SP}) 3600\, V_{eq}/T_{SP}$$

$\Delta P_{final,\,SP}$ is the final pressure difference setpoint for the balancing step (for example equal to 0), $\Delta P_{init}$ is the pressure difference measured at the start of the balancing step, $T_{SP}$ is the duration setpoint of the balancing step.

For controlling the valve, equations (19), (20) and (1) are used to obtain an equation between the measured variable (pressure) and the control variable (CV):

$$\frac{d\Delta P}{\sqrt{\Delta P}\sqrt{P_{b,init}+P_{g,init}+\Delta P}} = -\left[\frac{395 Y F_P}{3600 V_{eq}}\sqrt{\frac{2}{S_g TZ}}\right]CV(t)dt \quad (22)$$

This equation is solved by considering Y as constant for a balancing step in:

$$\mathrm{arcsinh}\left(\sqrt{\frac{\Delta P}{P_{b,init}+P_{g,init}}}\right) = \mathrm{arcsinh}\left(\sqrt{\frac{\Delta P_{init}}{P_{b,init}+P_{g,init}}}\right) - \frac{1}{\sqrt{2}}\frac{395 Y F_P}{3600 V_{eq}}\sqrt{\frac{1}{S_g TZ}}\left[\int_0^t CV\right]. \quad (23)$$

Equation (23) is also written, in terms of transfer function, as a saturated integral system:

$$\mathrm{arcsinh}\left(\sqrt{\frac{\Delta P}{P_{b,init}+P_{g,init}}}\right) = -K\left[\frac{CV}{s}\right]_{saturated} \quad (24)$$

$$K = \frac{1}{\sqrt{2}}\frac{395 Y F_P}{3600 V_{eq}}\sqrt{\frac{1}{S_g TZ}}. \quad (25)$$

where

The factor K thus obtained depends exclusively on the characteristic installation parameters $F_P$ and $V_{eq}$, and the characteristic flow parameters $S_g$, T and Z. Furthermore, for a balancing step without continuous repressurization, Y is considered as constant and equal to 0.8.

The system is linearized as described previously.

Similarly, in the alternative embodiment, a value of x=60% can be selected for the balancing step, and the $CV_{MAX}$ can be calculated accordingly, in relation to equation (12).

The pressure of the valve $V_{b3}$ is thereby adjusted.

Figure 9:
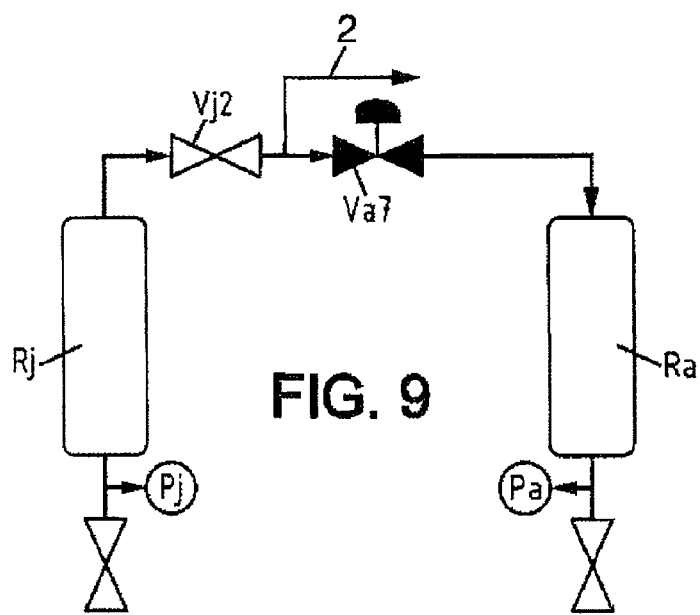
FIG. 9 shows a system subjected to a final repressurization step.

FIG. 9 shows a final repressurization step (right of column a) between the cylinder Rj and the cylinder Ra (FIG. 2). The valve Vj2 is fully open during this step, and the valve Va7 is controlled.

Theoretically, it can be written that the pressure Pa of the cylinder Ra is subject to the equation:

$$\frac{dPa}{dt} = \frac{Q_{a7}}{3600 V_{eq}}, \quad (26)$$

The production pressure $P_{prod}$ in the production line 2 being mainly constant, $dPa/dt = -d\Delta P/dt$.

By combining the equations (1) and (26), a CV forecasting term is obtained for the final repressurization step:

$$CV(t) = \frac{Q_{a7}}{395 F_P}\frac{\sqrt{\dfrac{S_g TZ P_{prod,init}}{\Delta P_{init} - \dfrac{Q_{a7}}{3600 V_{eq}^t}}}}{P_{prod,init} - \dfrac{\Delta P_{init} - \dfrac{Q_{a7}}{3600 V_{eq}^t}}{3 F_k x_t}}, \quad (27)$$

where:

$P_{prod,init}$ is the production pressure measured at the start of the final repressurization step, $Qa7 = (\Delta P_{init} - \Delta P_{final, SP}) 3600\, V_{eq}/T_{sp}$, $\Delta P_{final, SP}$ is the final pressure difference setpoint for the final repressurization step, $\Delta P_{init}$ is the pressure difference measured at the start of the final repressurization step, and $T_{sp}$ is the duration setpoint of the final repressurization step.

For controlling the valve, equations (1) and (26) are used to obtain an equation between the measured variable (pressure) and the control variable (CV):

$$\frac{d\Delta P}{\sqrt{\Delta P}} = -\left[\frac{395 Y F_P}{3600 V_{eq}}\sqrt{\frac{P_{prod,init}}{S_g TZ}}\right]CV(t)dt \quad (28)$$

This equation is solved by considering Y as constant in the final repressurization step, in:

$$\left(\sqrt{\frac{\Delta P}{P_{prod,init}}}\right) = \left(\sqrt{\frac{\Delta P_{init}}{P_{prod,init}}}\right) - \frac{1}{2}\frac{395 Y F_P}{3600 V_{eq}}\sqrt{\frac{1}{S_g TZ}}\left[\int_0^t CV dt\right]_{saturated} \quad (29)$$

Equation (29) is written, in terms of transfer function, as a saturated integral system:

$$\left(\sqrt{\frac{\Delta P}{P_{prod,init}}}\right) = -K\left[\frac{CV}{s}\right]_{saturated} \quad (30)$$

where $$K = \frac{1}{2}\frac{395 Y F_P}{3600 V_{eq}}\sqrt{\frac{1}{S_g TZ}} \quad (31)$$

The factor K thus obtained depends exclusively on the characteristic installation parameters $F_P$ and $V_{eq}$, and the characteristic flow parameters $S_g$, T and Z. Furthermore, for a final repressurization step, Y is considered as constant and equal to 0.9.

The system is linearized with respect to CV by regulating, not with respect to $\mathrm{arcsinh}[\sqrt{(\Delta P/P_{prod, init})}]$, but directly with respect to $[\sqrt{(\Delta P/P_{prod, init})}]$.

In the alternative embodiment, an expression is obtained for the permissible $CV_{max}$ for the valve:

$$CV_{MAX}(t) = \frac{x \cdot 0.4 \cdot 3600 S_{ads}}{395 F_p Y} \sqrt{D_e \frac{\rho_{ads}}{1.29} \cdot \frac{273.15}{1.01325} Z} \frac{\sqrt{P_a(t)}}{\sqrt{\Delta P(t) P_{prod}(t)}}, \quad (32)$$

where it is possible, for example, to take x=160% corresponding to a safety factor for a cylinder conveying a countercurrent flow.

The $CV_{MAX}$ can be used in the context of the regulation, by similarly modifying equation (8) to install the saturation at $CV_{MAX}$ in the integrator.

The pressure of the valve $V_{a7}$ is thereby adjusted.

Figure 10:
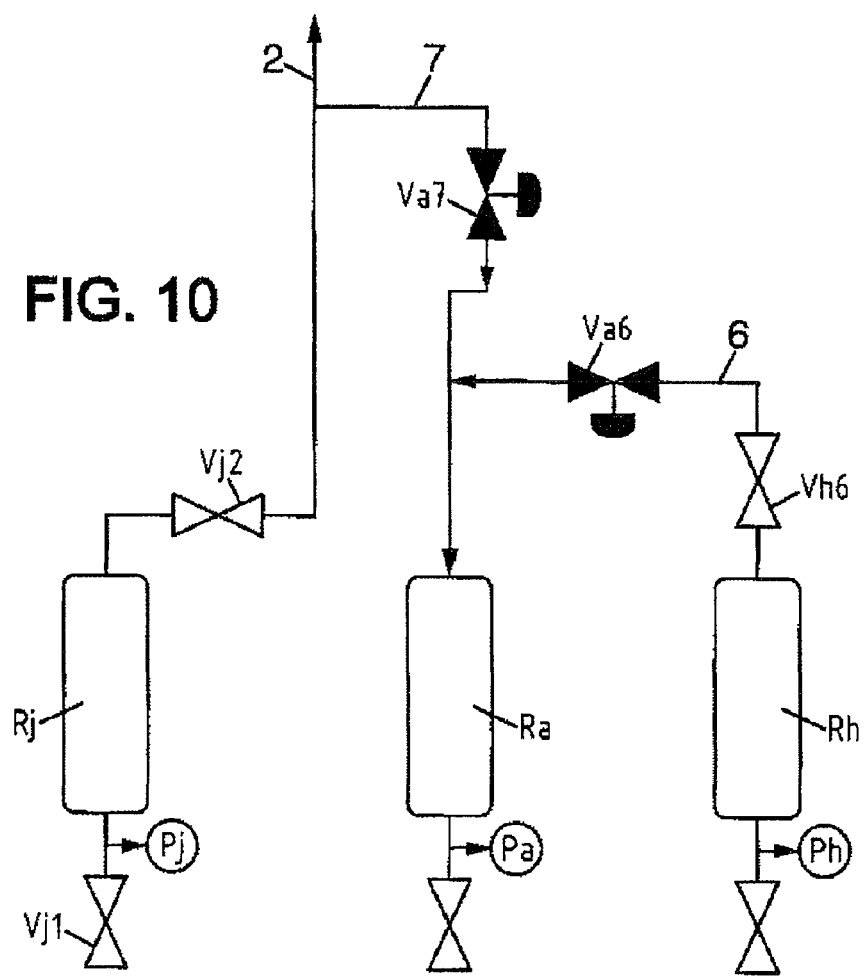
FIG. 10 shows a system subjected to a combined balancing and continuous repressurization step.

FIG. 10 shows a balancing step with continuous repressurization between the cylinder Rj and the cylinder Ra (FIG. 2 left hand part of column a) The valves vj2 and Vh6 are fully open. The valves Va6 and Va7 are controlled.

For controlling the balancing valve $V_{a6}$, it is difficult to obtain a similar expression to the expression (22), because of the combined influence of the balancing and the continuous repressurization. Initially, it may be possible to ignore the effect of the continuous repressurization and to consider the case of balancing alone. We are accordingly returned to the case examined previously in relation to FIG. 8.

The pressure of the valve $V_{a6}$ is thereby adjusted.

For controlling the valve Va7, the forecasting CV term is written:

$$CV_{a7}(t) = \frac{Q_{SP}}{395 F_P} \sqrt{\frac{S_g T Z P_{prod}}{\Delta P_{init} - \frac{Q_{a6}}{3600 V_{eq}^t}}}, \quad (33)$$

where:

$Q_{SP}$ is the flow rate setpoint, and $Q_{a6}$ is the flow rate calculated for the balancing of $V_{a6}$, as described previously in relation to FIG. 9, and $\Delta P_{init} = P_{prod,init} - P_{a,init}$ An attempt can be made to control the valve Va7 by flow rate, in order to obtain a substantially constant production gas flow rate in the production line 2. In consequence, an equation is developed between the flow rate Qa7 and the CV of this valve:

$$Q = 395 \, YF_p \sqrt{\frac{P_{prod}}{S_g T Z}} CV(t) \sqrt{P_{prod} - P_a}. \quad (34)$$

It is possible, for example, to model this system by assuming $$\frac{Q}{\sqrt{P_{prod,init}} \sqrt{P_{prod,init} - P_{a,init}}} = K \cdot CV \quad (35)$$

where $$K = \frac{395 \, YFp}{\sqrt{S_g T Z}}. \quad (36)$$

The factor K thus obtained depends exclusively on the characteristic installation parameter $F_p$ and the characteristic flow parameters $S_g$, T and Z. Furthermore, for a continuous repressurization step, Y is considered as constant and equal to 0.9.

The flow rate setpoint may, for example, be obtained from the mean of the difference between the flow rate at the inlet of the installation, and the production flow rate during the previous phase time (in its "final repressurization" part). This setpoint, calculated in the form of a difference, is not strictly equal to the flow rate passing through the continuous repressurization valve because a bias associated with the adsorption in the cylinder in production. However, it becomes consistent if the measurement used for the regulator is also the difference between the two flow rates. If the inlet flow rate is caused to change, a correction factor can be applied to the setpoint thus obtained.

This system is written, in terms of transfer function, as a proportional system.

The continuous repressurization valve is therefore adjusted for flow rate according to a proportional type of module with gain K. If a closed loop is initially considered with a time constant θ, the associated corrector is an integrator corrector.

As previously, θ may, for example, be determined by simulation, by disturbing the process to be regulated. This parameter may, for example, be selected between about 5 seconds and 100 seconds.

The pressure of the valve $V_{a7}$ is thus adjusted.

In the examples shown in FIGS. 9 and 10, the repressurization is carried out from the cylinder in production connected to the production line 2. In other exemplary embodiments, the repressurization could be carried out from the feed line 3, by using, as a physical flow parameter, a pressure difference between the cylinder in production and the cylinder undergoing repressurization.

The invention has been described here for a normal operating cycle of a PSA. However, it can just as well be applied to an exceptional PSA cycle, such as, for example, a cycle with 8 cylinders, when at least one of the cylinders is in maintenance, or other.

Figure 11:
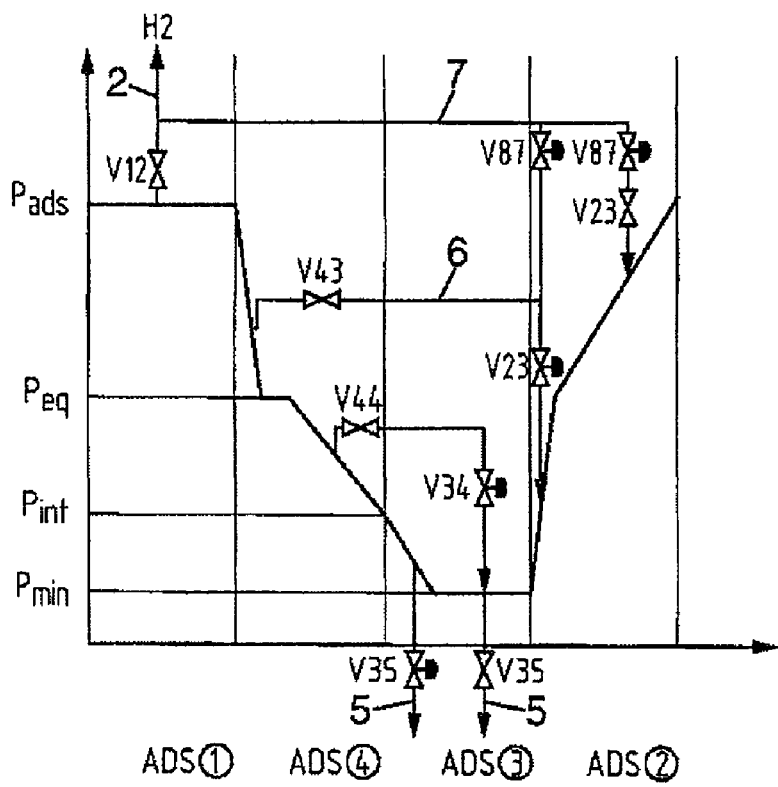
FIG. 11 is an operating cycle diagram similar to FIG. 2 for a second gas treatment installation.

Although the description has been given here with reference to a PSA comprising 10 cylinders, it goes without saying that the regulation described here could also be adapted to other types of PSA, and for example, to a PSA with four cylinders, whereof the cycle is shown in FIG. 11.

It may be observed that in this exemplary embodiment, the combined balancing and continuous repressurization model does not exactly correspond to the one presented in the first embodiment. In fact, the valve V23 is located here downstream of the junction between the connecting lines 6 and 7, which is not the case in FIG. 9.

Figure 12:
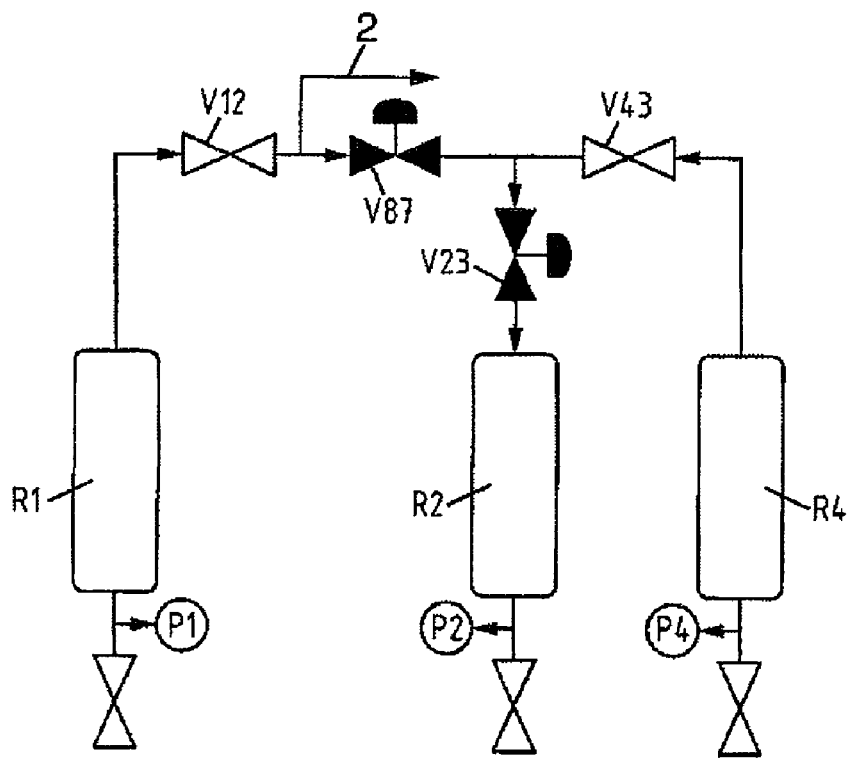
FIG. 12 shows a system subjected to a combined balancing and continuous repressurization step for the second installation.

Thus, FIG. 12 shows the combined balancing and continuous repressurization model for this second exemplary embodiment. The valves V43 and V12 are fully open during this step, the valve V87 (or repressurization valve) and the valve V23 (or balancing valve) are controlled.

Theoretically, it can be written that the pressure P4 of the cylinder R4 which supplies the balancing gas is subject to the equation:

$$\frac{dP4}{dt} = -\frac{(Q_{23} - Q_{SP})}{3600 V_{eq}}, \quad (37)$$

The pressure P2 of the cylinder R2 which receives the gas is subject to the equation:

$$\frac{dP2}{dt} = \frac{Q_{23}}{3600 V_{eq}}, \quad (38)$$

By combining equations (1), (37) and (38), a CV forecasting term is obtained for the valve V87 and the continuous repressurization step:

$$CV(t) = \frac{Q_{SP}}{395 F_P} \sqrt{\frac{S_g TZP_{prod,init}}{\Delta P_{init} + \frac{(Q_{23} - Q_{SP})}{3600 V_{eq}^t}}}, \quad (39)$$

where:

$$\Delta P_{init} = P_{prod, init} - P_{4, init}$$

It may be observed here that to estimate the maximum permissible speed, it is possible to take account of the fact that the flow rate passing through the cylinder in cocurrent mode is equal to the difference between the flow rate passing through the balancing valve V23 and the flow rate passing through the continuous repressurization valve V87.

The gas velocity can accordingly be written:

$$v = \frac{Q_{23} - Q_{87}}{3600 S_{ads}} \frac{1.01325}{P_{ads}} \frac{T_{ads}}{273.15}, \quad (40)$$

In consequence, and since $\rho_{gas} = 1.29 S_g$, an expression of the permissible $CV_{MAX}$ for the valve V23 is obtained:

$$CV_{MAX}(t) = \left[\frac{x \cdot 0.4 \cdot 3600 S_{ads}}{441 F_P Y} \sqrt{D_e \frac{\rho_{ads}}{\rho_{gas}} \cdot \frac{273.15}{1.01325} \frac{P_{mes}(t)}{T_{ads}}} + Q_{S7,mes}\right] \quad (41)$$

$$\frac{\sqrt{S_g T_{ads} Z}}{\sqrt{\Delta P(t) P_{mes}(t)}}.$$

It may be noted that x=0.6 can, for example, be assumed for determining the safety factor associated with the cylinder R4.

Pressure of the valve $V_{23}$ is thus adjusted.

It is possible, for example, to provide for the calculation to be carried out every second for the balancing and continuous repressurization steps, every 2 seconds for the elution and depressurization steps, and every 4 seconds for the final repressurization steps, but this frequency can be set according to the slope of the pressure ramp to be obtained, for example between 0.1 and 10 seconds.

The invention is thereby not limited to the two exemplary installations presented here, but a person skilled in the art is capable of implementing the models corresponding to a novel installation, as described here, to adjust the flow in the valves.

The regulation described here is easily transposed from one installation to another because the process parameters are automatically taken into account in the variable K during the adjustments.

Practically speaking, at the time of commissioning of the installation, the method for adjusting the correction parameters of the valve control unit of an installation for producing gas by adsorption is implemented by a software suitable for adjusting the correctors according to the characteristic flow and installation parameters, and the θ and ratio parameters entered by the user, for example, a supervision software. Then, during production, the control unit runs the installation based on a programmable controller program taking account of the correction parameters adjusted to control the opening of the valves.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for adjusting a control unit of an installation for treating gases by adsorption, said installation being suitable for implementing a method for producing gas during which a feed gas laden with impurities is supplied to the installation, for producing at least one gas issuing from the purification of the feed gas, said production method comprising a plurality of steps, during which a gas is subjected to a flow in said installation, said flow having a number of characteristic flow parameters, said installation comprising a plurality of members:
a feed line conveying a feed gas to be purified by adsorption,
a production line conveying a purified gas,
a removal line conveying an offgas, containing the impurities of the feed gas,
a plurality of cylinders ($R_1, \ldots, R_0$) containing at least one adsorbent material, said installation further comprising:
a plurality of connecting lines, each connecting two of said members together,
a valve on each of said connecting lines, each valve being suitable for being selectively closed to prevent a flow of gas in the connecting line, or opened according to a variable opening parameter, to allow a flow of gas in the connecting line,
a system being defined by two members connected together by a connecting line equipped with a valve,
said installation having a number of characteristic installation parameters, and
said control unit, suitable for ordering the opening of the valve according to an opening parameter for each system, for each step,
for each system, a detection device suitable for measuring a measured value of a physical parameter of the gas flow for the system,
said control unit being suitable for calculating, for each system, a forecasting parameter for opening the valve, a setpoint for said physical flow parameter, an error between a function of said setpoint and the function of said measured value,
said control unit being suitable for ordering the opening of the valve according to said opening parameter for each system, for each step, on the basis of at least said forecasting parameter for opening the valve, and at least one correction parameter applied to said error, said adjustment method comprising a step (a) in which said correction parameter is adjusted according to said characteristic installation and flow parameters.

2. The adjustment method of claim 1, in which the correction parameter is a proportional correction parameter applied to an error between the function of the current setpoint and the function of the current measured value.

3. The adjustment method of claim 2, in which, during the implementation of the gas production method, the control unit is suitable for ordering the opening of the valve further according to a previous opening parameter for the valve, a previous value of the forecasting parameter, said proportional correction parameter applied to an error between the function of a previous setpoint for the physical flow parameter and the function of a previous measured value for the physical flow parameter, and a second comprehensive correction parameter applied to said error between the function of a current setpoint for the physical flow parameter and the function of a current measured value for the physical flow parameter, during step (a) of the adjustment method, said second comprehensive correction parameter is adjusted according to said characteristic installation and flow parameters.

4. The adjustment method of claim 1, in which, during the implementation of the gas production method, the control unit is suitable for ordering the opening of the valve further according to a previous opening parameter for the valve, and a previous value of the forecasting parameter, and in which the correction parameter is a comprehensive correction parameter applied to the error between the function of the previous setpoint and the function of the previous measured value, adjustment method in which, during step (a), said comprehensive correction parameter is adjusted according to the installation and flow parameters.

5. The adjustment method of claim 1, in which, during the implementation of a gas production method, the control unit is suitable for ordering the opening of the valve further according to a maximum permissible value for said opening parameter.

6. A method for producing gas by adsorption using an installation comprising a control unit adjusted by an adjustment method of claim 1, said gas production method comprising a plurality of distinct steps extending between a phase beginning and a phase ending, during each of which, for at least a system comprising a first and a second member, a connecting line connecting said first and second members together, a valve on said connecting line, a gas flowing between the first and second members, the following steps are implemented repeatedly:

(b) the setpoint is calculated for the physical flow parameter;

(c) using the detection device, said measured value of said physical flow parameter is measured;

(d) the forecasting parameter for opening the valve is calculated as a function of time, of the characteristic installation and flow parameters, and of said setpoint for the physical flow parameter; and (e) the value of said opening parameter is calculated as a function of the correction parameter adjusted in step (a), applied to the error between the function of said measured value and the function of said setpoint for said physical flow parameter and of the forecasting opening parameter.

7. The production method of claim 6, in which an operating point of the system is measured at the beginning of a step, and in which, during step (e), said error is calculated by applying to said measured value and to said setpoint a nonlinear function of normalization to the operating point.

8. The production method of claim 6, in which the following steps are implemented repeatedly:

(f) a maximum permissible value is calculated for the opening parameter, as a function of time, of the characteristic installation and flow parameters, and of said measured value for the physical flow parameter; and (g) said maximum permissible value is compared with the value calculated in step (e) and, if said maximum permissible value is lower than said calculated value, said maximum permissible value is used instead of said calculated value.

9. The production method of claim 6, in which the first member is a first cylinder (R1, . . . , R0) containing an adsorbent, in which the second member is a second cylinder (R1, . . . , R0) containing an adsorbent, said production method comprising a balancing step during which a gas flows into the connecting line from the first to the second cylinder until a value of a pressure difference between the pressure in the second cylinder and the pressure in the first cylinder reaches a given value, and during which at least the steps (b) to (e) are implemented with, as the physical flow parameter, a pressure difference between the first and the second cylinder.

10. The production method of claim 6, in which the first member is a first cylinder (R1, . . . , R0) containing an adsorbent, in which the second member is a second cylinder (R1, . . . , R0) containing an adsorbent, said production method comprising an elution step during which a gas flows into the connecting line from the first to the second cylinder to rinse said second cylinder, and during which at least the steps (b) to (e) are implemented with, as physical flow parameter, a pressure difference between the first and the second cylinder.

11. The production method of claim 6, in which said installation comprises a production line delivering a gas produced by the installation, and a feed line conveying a gas supplied to said installation, in which the second member is a second cylinder (R1, . . . , R0) containing an adsorbent, said production method comprising a final repressurization step during which a gas flows into a connecting line to the second cylinder to increase a pressure value in the second cylinder, and during which at least the steps (b) to (e) are implemented with, as physical flow parameter, a pressure difference between a first cylinder connected to one of the production and feed lines and the second cylinder.

12. The production method of claim 6, in which the first member is a first cylinder containing an adsorbent, in which the second member is an offgas removal line, said production method comprising a depressurization step during which a gas flows into the connecting line between the first cylinder and the removal line until a low pressure level is reached for the first cylinder, and during which at least the steps (b) to (e) are implemented with, as physical flow parameter, a pressure difference between the first cylinder and the offgas removal line.

13. The production method of claim 6, in which said installation further comprises a feed line conveying a gas supplied to said installation at a feed rate, a production line from the installation delivering a gas produced at a production rate, and a balancing cylinder, a gas flowing from the balancing cylinder to a second cylinder during a balancing step until a pressure difference between the pressure in the second cylinder and the pressure in the balancing cylinder reaches a given value, in which the first member is a first cylinder connected to one of the feed and production lines, in which the second member is said second cylinder (R1, . . . , R0), said production method comprising a continuous repressurization step during which a gas flows into the connecting line between said line and the second cylinder until an operating pressure in the second cylinder is obtained, and during which at least the steps (b) to (e) are implemented with, as physical flow parameter, a difference between the production rate and the feed rate.

14. The production method of claim 6, in which, during at least one step of the production method, at least the step (e) is only implemented after a time lag at the start of the step of the production method, said time lag having a sufficient duration so that the physical flow parameter reaches a representative value.

* * * * *